US012742112B2

(12) United States Patent
Favero et al.

(10) Patent No.: US 12,742,112 B2
(45) Date of Patent: Sep. 22, 2026

(54) REVERSE EMULSION FOR HYDRAULIC FRACTURING

(71) Applicant: SNF GROUP, Andrezieux-Boutheon (FR)

(72) Inventors: Cédrick Favero, Andrezieux Cedex (FR); Olivier Braun, Andrezieux Cedex (FR); Bruno Tavernier, Andrezieux Cedex (FR)

(73) Assignee: SNF GROUP, Andrézieux-Bouthéon (FR)

( * ) Notice: Subject to any disclaimer, the term of this patent is extended or adjusted under 35 U.S.C. 154(b) by 922 days.

(21) Appl. No.: 17/599,232

(22) PCT Filed: Mar. 27, 2020

(86) PCT No.: PCT/EP2020/058703
§ 371 (c)(1),
(2) Date: Sep. 28, 2021

(87) PCT Pub. No.: WO2020/201081
PCT Pub. Date: Oct. 8, 2020

(65) Prior Publication Data
US 2022/0177773 A1 Jun. 9, 2022

(30) Foreign Application Priority Data
Mar. 29, 2019 (FR) .................................... 19 03409

(51) Int. Cl.
*C09K 8/64* (2006.01)
*C09K 8/80* (2006.01)
*E21B 43/267* (2006.01)

(52) U.S. Cl.
CPC ................. *C09K 8/64* (2013.01); *C09K 8/80* (2013.01); *E21B 43/267* (2013.01)

(58) Field of Classification Search
CPC ... C09K 8/64; C09K 8/60; C09K 8/80; C09K 2208/28; C09K 8/68; C09K 8/88; E21B 43/267; C08F 2/22; C08F 2/24; C08F 2/32; C08F 220/56; C08F 220/34; C08L 33/26
See application file for complete search history.

(56) References Cited

U.S. PATENT DOCUMENTS 5,185,393 A 2/1993 Kanda et al.
5,925,714 A 7/1999 Larson et al.
6,369,182 B1 4/2002 Whipple et al.
6,627,719 B2 9/2003 Whipple et al.
7,004,254 B1 * 2/2006 Chatterji ................ C09K 8/12 507/225
9,315,722 B1 4/2016 Jackson et al.
2003/0060586 A1 3/2003 Whipple et al.
2010/0307753 A1 * 12/2010 Rey ......................... C09K 8/88 166/305.1
2017/0121590 A1 * 5/2017 Lopez ................... C09K 8/035
2018/0072935 A1 3/2018 Frederick et al.

FOREIGN PATENT DOCUMENTS

RU 2 019 688 9/1994
RU 2 359 002 6/2009
WO WO 2009/053029 10/2008
WO WO-2017035317 A1 * 3/2017 .............. C09K 8/36

OTHER PUBLICATIONS

International Search Report for PCT/EP2020/058703 dated Apr. 10, 2020.
Preliminary Search Report for FR 1903409 dated Jan. 21, 2020.
Armanet, et al.: "Phase inversion of polyacrylamide-based inverse-emulsions: Influence of inverting-surfactant type and concentration", Journal of Applied Polymer Science, vol. 103, No. 6, (Mar. 15, 2007) , pp. 3567-3584, XP055656516.
Written Opinion for PCT/EP2020/058703, Mar. 27, 2020.
Armanet, et al., "Phase Inversion of Polyacrylamide-Based Inverse-Emulsions: Influence of Inverting-Surfactant Type and Concentration", 2007, pp. 3567-3584, vol. 103, Journal of Applied Polymer Science.
L.I. Bondaletova, V.M. Sutyagin "Viscometric method for determining molecular weight: Methodological manual for performing laboratory work in the course Chemistry and Physics high-molecular compounds" for students of direction 550800, specialty 250500 / Comp.—Tomsk: Publishing house, TPU, 2003—12 p.
Basov, et al, "Quality Control of Polymer Materials", pp. 1-2, Chemistry, 1990.
Clariant International Ltd., "Process aids and intermediates for the chemical industry" Surfactants, pp. 1-19 (2015).

* cited by examiner

*Primary Examiner* — Alicia Bland
(74) *Attorney, Agent, or Firm* — B. Aaron Schulman, Esq.; Stites & Harbison, PLLC

(57) ABSTRACT

The present application relates to a water-in-oil reverse emulsion comprising
- an oil;
- water;
- at least one water-soluble cationic copolymer with an average molar mass of more than 3 million daltons, containing between 18 and 32 mole % of cationic monomers and 68 and 82 mole of nonionic monomers;
- at least one reversing agent and at least one emulsifying agent, the weight ratio R of the total amount of reversing agent to the total amount of emulsifying agent being greater than 1.8,
- the reversing agent being selected from an ethoxylated nonylphenol, preferably having between 4 and 10 ethoxylations; an ethoxylated/propoxylated alcohol, preferably having ethoxylations/propoxylations so as to have a total carbon number between C12 and C25, an ethoxylated tridecyl alcohol and an ethoxylated/ propoxylated fatty alcohol.
- the emulsifying agent being selected from sorbitan monooleate, polyethoxylated sorbitan esters or diethanolamide of tall oil fatty acids,
- and its use in hydraulic fracturing.

13 Claims, No Drawings

REVERSE EMULSION FOR HYDRAULIC FRACTURING

The present invention relates to the technical field of polymers in the form of a water-in-oil emulsion, otherwise known as a reverse emulsion. More specifically, the invention concerns a reverse emulsion containing a cationic polymer that is stable under very high salinity conditions.

Other aspects of the invention relate to a method of preparing a fracturing fluid and a method of hydraulically fracturing unconventional oil and gas subterranean reservoirs using said reverse emulsion and finally the last aspect of the invention relates to a method of reducing friction of a fracturing fluid in a hydraulic fracturing operation.

PRIOR ART

The production of oil (hydrocarbons) and gas contained in unconventional underground reservoirs has been developing for several years and requires the opening of fractures in the reservoir for economic production of the oil and gas.

In the following description of the prior art and the invention, "unconventional underground reservoirs" is used to refer to deposits requiring special extraction technologies because they do not exist in the form of an accumulation in a porous and permeable rock (see *Les hydrocarbures de roche-mère en France Rapport provisoire—CGIET No.* 2011-04-*G—Ministère de l'écologie, du développement durable, des transports et du logement—April* 2011). Unconventional gas includes shale gas, coal bed methane and tight gas. Unconventional oil includes heavy oil, shale oil and tight oil.

The reserves contained in unconventional reservoirs are huge, and extremely large in previously unreachable areas such as bedrock hydrocarbons like shale, tight gas, and coal bed methane. In the US, shale gas is widely extracted and now accounts for 46% of total natural gas produced in the US, up from 28% in 1998. The very large basins are known as the Barnett Shale, Ville Fayette Shale, Mowry Shale, Marcellus Shale, Utica Shale, etc. The exploitation of tight gas reservoirs has been made possible by an advance in drilling techniques.

Production techniques have evolved from vertical to horizontal wells, reducing both the number of production wells needed and their footprint, and allowing for better coverage of the reservoir volume for maximum gas recovery. However, the permeabilities are insufficient for the gas to migrate from the source rock to the well easily, and thus to produce the gas or oil economically and in quantity. It is therefore necessary to increase the permeability and production surfaces by stimulation operations and in particular by hydraulic fracturing of the rock in contact with the well.

Hydraulic Fracturing

The purpose of hydraulic fracturing is to create additional permeability and to create larger areas for gas or oil production. Indeed, low permeability, natural barriers of compact layers, and impermeabilisation by drilling operations greatly limit production. The gas or oil in the unconventional reservoir cannot easily migrate from the rock to the well without stimulation.

Hydraulic fracturing operations on horizontal wells began in 1960 in Appalachia and today tens of thousands of operations have taken place in the US.

The technologies for reservoir design, modelling, drilling, cementing and stimulation have become increasingly sophisticated, with equipment that allows these operations to be carried out in ever shorter timeframes with accurate analysis of the results.

Reservoir Stimulation by Hydraulic Fracturing

These operations consist of injecting water at high pressure and very high flow rates to create fractures distributed perpendicular to the production wells. This is usually done in several stages to create fractures along the entire length of the horizontal well, thus covering the maximum volume of the reservoir.

In order to keep these fractures open, a propping agent (e.g. sand, plastics or graded ceramics) is added so as to prevent the closure of these fractures and to maintain the capillarity created once the injection has stopped.

In order to reduce the hydraulic power needed to inject water or brine rapidly into the underground formation, polymers known as friction reducers are used. By using such polymers, pressure losses due to internal friction in the fluid can be reduced by up to 70%.

Reverse emulsion polymers are commonly used for their ease of processing. Their use is based on dissolving the polymer in water or brine. To do this, the reverse emulsion is reversed, so that the polymer contained in the water phase of the reverse emulsion is released. After release, the polymer is in the water or brine into which the reverse emulsion has been added.

Fracturing fluids are increasingly based on water containing significant amounts of dissolved salts. In this context, the industry requires friction reducers that work efficiently in high brines (brine with a high concentration of dissolved salts), some of which can contain more than 30,000 $mg \cdot L^{-1}$ of dissolved salts, or even more than 100,000 $mg \cdot L^{-1}$ with, in particular, high levels of divalent salts.

DESCRIPTION OF THE INVENTION

Surprisingly, the applicant has found that a water-in-oil reverse emulsion of a specific composition gives superior performance in terms of friction reduction under very high salinity conditions with high levels of divalent salts.

The invention also relates to a process for preparing a fracturing fluid using the emulsion of the invention.

A third aspect of the invention relates to a hydraulic fracturing method in which the injection fluid has been prepared according to the method of the preceding invention.

Finally, a last aspect of the invention concerns a method of reducing friction of a fracturing fluid in a hydraulic fracturing operation using the emulsion of the invention.

More specifically, the invention relates firstly to a water-in-oil reverse emulsion comprising:

- an oil;
- water;
- at least one water-soluble cationic copolymer with an average molecular mass of more than 3 million daltons, containing between 18 and 32 mole % of cationic monomers and 68 and 82 mole % of nonionic monomers;
- at least one reversing agent and at least one emulsifying agent, the weight ratio R of the total amount of reversing agent to the total amount of emulsifying agent being greater than 1.8,
  - the reversing agent being selected from an ethoxylated nonylphenol, preferably having between 4 and 10 ethoxylations; an ethoxylated/propoxylated alcohol, preferably having ethoxylations/propoxylations so as to have a total carbon number between C12 and C25, an ethoxylated tridecyl alcohol and an ethoxylated/propoxylated fatty alcohol.

the emulsifying agent being selected from sorbitan monooleate, polyethoxylated sorbitan esters or diethanolamide of tall oil fatty acids.

The oil used to prepare the water-in-oil emulsion of the invention may be a mineral oil, a vegetable oil, a synthetic oil or a mixture of a plurality of these oils. Examples of mineral oils are mineral oils containing saturated hydrocarbons of the aliphatic, naphthenic, paraffinic, isoparaffinic, cycloparaffinic or naphthyl type. Examples of synthetic oil are hydrogenated polydecene or hydrogenated polyisobutene, an ester such as octyl stearate or butyl oleate. Exxon's Exxsol® product range is ideal.

In general, the weight ratio of the aqueous phase to the oil phase in the reverse emulsion is preferably from 50/50 to 90/10, and preferably from 70/30 to 80/20.

The water-in-oil emulsion advantageously comprises from 12 to 24% by weight of oil, more advantageously from 15 to 22% by weight.

The water-in-oil emulsion advantageously comprises from 30 to 55% by weight of water, more advantageously from 35 to 48% by weight.

As used here, the term "water-soluble polymer" refers to a polymer that yields an aqueous solution without insoluble particles when dissolved under agitation for 4 hours at 25° C. and with a concentration of 20 g·L−1 in water.

In the present invention, the term "emulsifying agent" refers to an agent capable of emulsifying water in oil and an "reversing agent" is an agent capable of emulsifying oil in water. More specifically, a reversing agent is considered to be a surfactant with an HLB greater than or equal to 10, and an emulsifying agent is a surfactant with an HLB strictly less than 10.

The hydrophilic-lipophilic balance (HLB) of a chemical compound is a measure of its degree of hydrophilicity or lipophilicity, determined by calculating the values of the different regions of the molecule, as described by Griffin in 1949 (Griffin W C, *Classification of Surface-Active Agents by HLB*, Journal of the Society of Cosmetic Chemists, 1949, 1, pages 311-326).

In the present invention, we have adopted Griffin's method based on calculating a value based on the chemical groups of the molecule. Griffin assigned a dimensionless number between 0 and 20 to give information on the solubility in water and oil. Substances with an HLB value of 10 are distributed between the two phases, so that the hydrophilic group (molecular weight Mh) projects completely into the water while the hydrophobic hydrocarbon group (molecular weight Mp) is adsorbed in the non-aqueous phase.

The HLB value of a substance with a total molecular weight M, whose hydrophilic part has a molecular weight Mh, is:

$$HLB = 20(Mh/M)$$

The water-in-oil emulsion according to the invention can be prepared according to any process known to a person skilled in the art. Typically, an aqueous solution comprising the monomer(s) and emulsifying agent(s) is emulsified in an oil phase. Polymerization is then carried out by adding a free radical initiator. Reference can be made to redox couples, with cumene hydroperoxide, tertiary butylhydroxyperoxide or persulphates among the oxidizing agents, sodium sulphite, sodium metabisulphite and Mohr's salt among the reducing agents. Azo compounds such as 2,2'-azobis (isobutyronitrile) hydrochloride and 2,2'-azobis (2-amidinopropane) hydrochloride can also be used.

Typically, the polymerization is carried out isothermally, adiabatically or at controlled temperature. That is, the temperature is kept constant, usually between 10 and 60° C. (isothermal), or the temperature is allowed to rise naturally (adiabatic) and in this case the reaction is usually started at a temperature below 10° C. and the final temperature is usually above 50° C. or, finally, the temperature rise is controlled so that the temperature curve is between the isothermal and the adiabatic curve.

Typically, the reversing agent(s) is added at the end of the polymerization reaction, preferably at a temperature below 50° C.

Preferably the emulsion of the invention contains between 12 and 50% by weight of water-soluble polymer (dry weight), preferably between 12 and 40% by weight and even more preferably between 12 and 30% by weight.

According to another preference, for the emulsion of the invention, the weight ratio R of the total amount of reversing agent to the total amount of emulsifying agent is greater than 1.8, preferably greater than 2, even more preferably greater than 2.5, even more preferably greater than 3, even more preferably greater than 3.5, even more preferably greater than 4.

The water-soluble cationic polymer contained in the emulsion of the invention is a copolymer of non-ionic and cationic monomers.

The non-ionic monomers are preferably selected from acrylamide, methacrylamide, N-alkylacrylamides, N-alkylmethacrylamides, N,N dialkylacrylamides, N,N dialkylmethacrylamides, acrylic esters, and methacrylic esters. The preferred non-ionic monomer is acrylamide.

The cationic monomers are preferably selected from dimethylaminoethyl acrylate (DMAEA) or its quaternized ammonium salts, dimethylaminoethyl methacrylate (DMAEMA) or its quaternized ammonium salts, dimethyldiallylammonium chloride (DADMAC), acrylamido propyltrimethyl ammonium chloride (APTAC), and methacrylamido propyltrimethyl ammonium chloride (MAPTAC). Preferably the quaternized ammonium salts of the monomers DMAEA or DMAEMA are obtained by quaternization with alkyl chlorides, preferably methyl chloride. The preferred cationic monomer is dimethylaminoethyl acrylate quaternized with methyl chloride.

Several non-ionic and cationic monomers can be selected to form the cationic copolymer. Advantageously, the water-soluble cationic polymer is a copolymer of acrylamide and dimethylaminoethyl acrylate quaternized with methyl chloride.

The water-soluble cationic polymer has an average molecular mass of over 3 million daltons. Preferably this average molecular mass is between 3 and 30 million daltons and even more preferably between 8 and 18 million daltons.

The "average molecular mass" according to the present invention is determined by the intrinsic viscosity. The intrinsic viscosity can be measured by methods known to the person skilled in the art and can in particular be calculated from the reduced viscosity values for different concentrations by a graphical method consisting of plotting the reduced viscosity values (on the y-axis) as a function of the concentrations (on the x-axis) and extrapolating the curve to a zero concentration. The intrinsic viscosity value is read on the y-axis or using the least squares method. Then the weight average molecular weight can be determined by the famous Mark-Houwink equation:

$$[\eta] = KM^{\alpha}$$

[η] is the intrinsic viscosity of the polymer as determined by the solution viscosity method, K is an empirical constant, M is the molecular weight of the polymer, α is the Mark-Houwink coefficient α and K depend on the particular polymer-solvent system.

The emulsion of the invention preferably contains between 0.5 and 10% by weight of reversing agent and between 0.5 and 16% by weight of emulsifying agent.

The water-in-oil emulsion advantageously comprises from 0.8 to 2% by weight of at least one emulsifying agent.

The water-in-oil emulsion advantageously comprises from 3 to 6% by weight of at least one reversing agent.

Optionally the water-in-oil emulsion comprises from 1 to 40% by weight of salts, preferably from 3 to 30% by weight, more preferably from 5 to 25% by weight and even more preferably from 7 to 17% by weight salts.

The salts present in the water-in-oil emulsion may, for instance, be sodium salts, lithium salts, potassium salts, magnesium salts, aluminum salts, ammonium salts, phosphate salts, sulphate salts, chloride salts, citrate salts, acetate salts, hydrogen phosphate tartrate salts, water-soluble inorganic salts or other inorganic salts and mixtures thereof. These salts include sodium chloride, sodium sulphate, sodium bromide, calcium chloride, ammonium sulphate, ammonium chloride, lithium chloride, lithium bromide, potassium chloride, potassium bromide, magnesium sulphate, aluminium sulphate, sodium hydrogen phosphate, potassium hydrogen phosphate and mixtures thereof. Sodium chloride, calcium chloride, ammonium chloride, ammonium sulphate are preferred, and mixtures thereof are further preferred.

Another aspect of the invention relates to a method of preparing a fracturing fluid comprising:

a) The provision of a reverse emulsion according to the invention, b) The reversing of the reverse emulsion by adding it to a brine, containing more than 30,000 ppm of salts and with a divalent ratio $R^+ \geq 0.15$, $R^+$=mass ratio: divalent salts/total salts, c) Possibly the addition of at least one propping agent.

Total salts means the total amount of salt in the brine.

The brine may contain monovalent and/or polyvalent salts or combinations thereof. Examples of salts include, but are not limited to, sodium, lithium, potassium, aluminium, ammonium, phosphate, sulphate, magnesium, barium, nitrate, and other inorganic salts and mixtures thereof.

The brine preferably contains at least one of the following elements: sodium chloride, calcium chloride, sodium bromide, calcium bromide, barium chloride, magnesium chloride, zinc bromide, sodium formate and potassium formate.

Preferably the brine used for the preparation of the fracturing fluid contains more than 70,000 ppm of salts and preferably more than 100,000 ppm of salts, preferably the brine contains from 70,000 to 350,000 ppm of salts, preferably from 100,000 to 350,000 ppm.

According to an advantageous embodiment of the method of preparing the fracturing fluid:

- when the brine comprises from 30,000 ppm to 70,000 ppm (upper limit excluded) of salts (step b), the ratio R of the emulsion (step a) is preferably greater than 1.8,
- when the brine comprises from 70,000 ppm to 100,000 ppm (upper limit excluded), the ratio R of the emulsion is preferably greater than 2,
- when the brine comprises from 100,000 ppm to 150,000 ppm (upper limit excluded) of salts, the ratio R of the emulsion is preferably greater than 2.5,
- when the brine comprises from 150,000 ppm to 200,000 ppm (upper limit excluded) of salts, the ratio R of the emulsion is preferably greater than 3,
- when the brine comprises from 200,000 ppm to 250,000 ppm (upper limit excluded) of salts, the ratio R of the emulsion is preferably greater than 3.5, and
- when the brine comprises more than 250,000 ppm (upper limit excluded) of salts, the ratio R of the emulsion is preferably greater than 4.

Preferably the divalent ratio $R^+$=mass ratio: divalent salts/total salts is greater than or equal to 0.20 and even more preferably $R^+ \geq 0.25$.

The reversing of the emulsion of the invention in brine can advantageously be achieved with the device and method of document U.S. Pat. No. 8,383,560 where the emulsion is continuously dissolved with a multiple static mixer arrangement.

The present invention also relates to the fracturing fluid obtained by the method of the invention, in particular a fracturing fluid comprising:

- A brine solution;
- A water-soluble cationic (co)polymer according to the invention;
- The oil of the reverse emulsion of the invention;
- Water.

The propping agent may be selected non-restrictively from sand, ceramic, bauxite, glass beads, and resin-impregnated sand. It preferably represents 0.5 to 40%, more preferably 1 to 25% and even more preferably 1.5 to 20%, by weight of the fracturing fluid.

The fracturing fluid according to the invention preferably comprises between 0.01% and 3% by weight of water-soluble cationic (co)polymer of the invention (added in the form of an emulsion), and even more preferably between 0.05% and 1%, by weight.

The brine that makes up the fracturing fluid may include other compounds known to the skilled person, such as those listed in SPE 152596, for example:

- Anti-swelling agents for clays such as potassium chloride or choline chloride, and/or
- Biocides to prevent the development of bacteria, in particular sulphate-reducing bacteria, which can form viscous masses that reduce the passage surfaces. Examples include glutaraldehyde, which is the most commonly used, or formaldehyde or isothiazolinones, and/or
- Oxygen reducers such as ammonium bisulphite to avoid oxidative destruction of other components and corrosion of injection tubes, and/or
- Anti-corrosion additives to protect the tubes from oxidation by residual amounts of oxygen, with N,N dimethylformamide being preferred, and/or
- Lubricants such as oil distillates, and/or
  - Iron chelators such as citric acid, EDTA (ethylenediaminetetraacetic acid), phosphonates, and/or
- Anti-scaling products such as phosphates, phosphonates, polyacrylates or ethylene glycol.

According to a preferred embodiment, the process of preparing a fracturing fluid comprises:

a) The provision of a reverse emulsion according to the invention containing at least between 12 and 30% by weight of a water-soluble cationic copolymer containing between 18 and 32 mole % of dimethylaminoethyl acrylate quaternized with methyl chloride and 68 and 82 mole % of acrylamide; at least one reversing agent and at least one emulsifying agent, the weight ratio R of the total amount of reversing agent to the total amount of emulsifying agent being greater than 2.5, b) The reversing of the reverse emulsion by adding it to a brine, containing more than 100,000 ppm of salts and with a divalent ratio $R^{+} \geq 0.2$, $R^{+}$=mass ratio: divalent salts/total salts, in order to obtain a mass concentration of water-soluble cationic copolymers in the injection fluid that is between 0.05 and 1%.

c) Possibly the addition of at least one propping agent.

A third aspect of the invention relates to a method of hydraulically fracturing an unconventional underground oil or gas reservoir comprising preparing a fracturing fluid as described above, and injecting said fracturing fluid into an underground formation.

More specifically, the invention relates to a method of fracturing an underground formation comprising:

aa) providing a fracturing fluid obtained according to the preparation method described above, bb) introducing the injection fluid into a part of the underground formation, cc) fracturing the underground formation with the injection fluid, dd) recovering a mixture of gas, oil and aqueous fluid.

Injection is carried out under pressure so as to create fractures distributed along the length of the production well.

Optionally, after the creation of the fractures, at least one oxidizing compound and/or at least one surfactant compound is injected into the reservoir.

The injection of these compounds restores a fluid viscosity close to that of water.

Examples of oxidizing compounds are bleach (aqueous solution of a hypochlorite salt), hydrogen peroxide, ozone, chloramines, persulphates, permanganates or perchlorates.

The chemical nature of the surfactant(s) is not critical. They can be anionic, non-ionic, amphoteric, zwitterionic and/or cationic. Preferably, the surface-active compound(s) of the invention carry(-ies) anionic charges.

Preferably, the surface-active compounds used are selected from anionic surface-active agents and their zwitterions selected from the group comprising derivatives of alkylsulphates, alkyl ether sulphates, aryl alkyl sulphates, aryl alkyl ether sulphates, alkyl sulphonates, alkyl ether sulphonates, aryl alkyl sulphonates, aryl alkyl ether sulphonates, alkylphosphates, alkyl etherphosphates, arylalkylphosphates, arylalkyletherphosphates, alkylphosphonates, alkyl etherphosphonates, arylalkylphosphonates, arylalkyletherphosphonates, alkyl carboxylates, alkyl ether carboxylates, arylalkyl carboxylates, arylalkylether carboxylates, polyalkyl ethers, and arylalkyl polyethers.

Finally, a fourth and last aspect of the invention relates to a method of reducing fracturing fluid friction in a hydraulic fracturing operation of an unconventional oil or gas underground reservoir, comprising preparing a fracturing fluid as described above, and injecting said fracturing fluid into an underground formation.

Friction reduction reduces or eliminates friction-related losses during the injection of the fracturing fluid.

For hydraulic fracturing, friction reduction involves the polymer in the fracturing fluid providing rheofluidizing properties to the solution so that it has a relatively low viscosity during injection (at high shear) and a high viscosity to keep the propping agent suspended at the fracture as the shear decreases.

The invention and the resulting advantages will become apparent from the following embodiments.

EXAMPLES

Example 1 (Counter-Example): Emulsion Containing 20% by Weight of a Polymer Comprising 15 mol % of Cationic Monomers An aqueous phase is prepared with 27.00 wt % acrylamide solution (50 wt % in water), 8.12 wt % DMAEA-MC (methyl chloride quaternized dimethylaminoethyl, 80 wt % in water) solution, 39.87 wt % deionized water and 0.02 wt % Versenex 80.

An oil phase is prepared from 23.45% wt % of oil (Exxsol® D100 S) and the following emulsifying agents: 1.16% wt % of Witcamide® 511 (tall oil fatty acid diethanolamine), 0.16% wt % of Span® 80 (sorbitan monooleate) and 0.23% wt % of Tween® 81 (sorbitan monooleate 5EO).

The water phase is added to the oil phase while mixing to form an emulsion. The resulting dispersion is bubbled with nitrogen for 30 minutes while the temperature is stabilized at 25° C., at which time 0.002 wt % peroxide is added to the emulsion and a 0.075 wt % solution of sodium metabisulphite (MBS) is introduced into the dispersion at a flow rate of 0.1 millilitres per minute. The polymerization temperature is controlled between 38° C. and 42° C. for approximately 90 minutes. Residual monomers are trapped by introducing a 0.03 wt % solution of sodium metabisulphite (MBS) at a flow rate of 1.0 millilitre per minute. A water-in-oil polymer emulsion containing 20% active copolymer of acrylamide and ADC is obtained.

1.75% by weight of a reversing agent (Marlophen® NP 8, nonylphenol polyethylene glycol ethers 8 OE) is added to the water-in-oil polymer emulsion to facilitate tuning during use. The mass ratio R is 1.5.

Example 2 (Counter-Example): Emulsion Containing 20% by Weight of a Polymer Comprising 20 mol % of Cationic Monomers An aqueous phase is prepared with 23.78 wt % acrylamide solution (50 wt % in water), 10.14 wt % DMAEA-MC (methyl chloride quaternized dimethylaminoethyl, 80 wt % in water) solution, 41.08 wt % deionized water and 0.02 wt % Versenex 80.

An oil phase is prepared from 23.45% by weight of oil (Exxsol® D100 S) and the following emulsifying agents: 1.16% wt % of Witcamide® 511 (tall oil fatty acid diethanolamine), 0.16% wt % of Span® 80 (sorbitan monooleate) and 0.23% wt % of Tween® 81 (sorbitan monooleate 5EO).

The water phase is added to the oil phase while mixing to form an emulsion. The resulting dispersion is bubbled with nitrogen for 30 minutes while the temperature is stabilized at 25° C., at which time 0.002 wt % peroxide is added to the emulsion and a 0.075 wt % solution of sodium metabisulphite (SMBS) is introduced into the dispersion at a flow rate of 0.1 millilitres per minute. The polymerization temperature is controlled between 38° C. and 42° C. for approximately 90 minutes. Residual monomers are trapped by introducing a 0.03 wt % solution of sodium metabisulphite (SMBS) at a flow rate of 1.0 millilitre per minute. A water-in-oil polymer emulsion containing 20% active copolymer of acrylamide and MC-DMAEA is obtained.

1.75% by weight of a reversing agent (Marlophen® NP 8, nonylphenol polyethylene glycol ethers 8 OE) is added to the water-in-oil polymer emulsion to facilitate tuning during use. The mass ratio R is 1.5.

Example 3 (Counter-Example): Emulsion Containing 20% by Weight of a Polymer Comprising 35 mol % of Cationic Monomers An aqueous phase is prepared with 16.20 wt % acrylamide solution (50 wt % in water), 14.87 wt % DMAEA-MC (methyl chloride quaternized dimethylaminoethyl, 80 wt % in water) solution, 43.92 wt % deionized water and 0.02 wt % Versenex 80.

An oil phase is prepared from 23.45% wt % of oil (Exxsol® D100 S) and the following emulsifying agents: 1.16% wt % of Witcamide® 511 (tall oil fatty acid diethanolamine), 0.16% wt % of Span® 80 (sorbitan monooleate) and 0.23% wt % of Tween® 81 (sorbitan monooleate 5EO).

The water phase is added to the oil phase while mixing to form an emulsion. The resulting dispersion is bubbled with nitrogen for 30 minutes while the temperature is stabilized at 25° C., at which time 0.002 wt % peroxide is added to the emulsion and a 0.075 wt % solution of sodium metabisulphite (SMBS) is introduced into the dispersion at a flow rate of 0.1 millilitres per minute. The polymerization temperature is controlled between 38° C. and 42° C. for approximately 90 minutes. Residual monomers are trapped by introducing a 0.03 wt % solution of sodium metabisulphite (SMBS) at a flow rate of 1.0 millilitre per minute. A water-in-oil polymer emulsion containing 20% active copolymer of acrylamide and ADC is obtained.

1.75% by weight of a reversing agent (Marlophen® NP 8, nonylphenol polyethylene glycol ethers 8 OE) is added to the water-in-oil polymer emulsion to facilitate tuning during use. The mass ratio R is 1.5.

The following examples are made with a mass ratio R according to the invention. Examples 4 and 7, then 5 and 8, and finally 6 and 9 are manufactured using the same process as examples 1, 2 and 3, but with higher quantities of Marlophen® NP 8 (reversing agent). Table 1 describes the mass ratio R for each example.

TABLE 1

| Mass ratios R of water-in-oil emulsions | | | |
|---|---|---|---|
| Example | Mass ratio R | Cationicity (mole %) | Reversing agent (quantities vary by example) |
| 1 | 1.5 | | |
| 4 | 2.5 | 15 | |
| 7 | 4.0 | | |
| 2 | 1.5 | | |
| 5 | 2.5 | 20 | Mariophen ® NP 8 |
| 8 | 4.0 | | |
| 3 | 1.5 | | |
| 6 | 2.5 | 35 | |
| 9 | 4.0 | | |

Friction Flow Loop Test

A friction flow loop was constructed from ¼" outer diameter stainless steel tubing with a total length of 20 feet. The test solutions are pumped to the bottom of a 5-liter conical tank. The solution passes through the tubing and is returned to the tank. The flow rate is achieved by means of a triplex pump equipped with a variable speed drive.

4 liters of 9% $CaCl_2$ brine, or API or 2×API brine, are prepared in the sample tank and the pump is started and set to deliver 1.5 gal/min. The 9% $CaCl_2$ brine corresponds to 9 g of $CaCl_2$ in 100 ml of water, its $R^+$ is 1.00. API brine is defined as 8.5 g NaCl+2.5 g $CaCl_2$ in 100 ml water, with its R+ being equal to 0.20. 2×API brine corresponds to 17 g NaCl+5 g $CaCl_2$ in 100 ml water, with its $R^+$ being equal to 0.20. The saline solution is recirculated until the temperature equilibrates to 25° C. and a stabilized pressure differential is reached. This pressure is recorded as the "initial pressure" of the 9% $CaCl_2$ or API or 2×API brine.

The test quantity of pure water-in-oil emulsion polymer is rapidly injected with a syringe into the sample tank containing the 9% $CaCl_2$ or API or 2×API brine and a timer is started. The dose is recorded in gallons of water-in-oil emulsion per thousand gallons of 9% $CaCl_2$ or API or 2×API brine (gpt). The pressure is recorded every second for 5 minutes. The percentage reduction of friction (% FRt) at a given time "t" is calculated from the initial pressure drop ΔPi and the pressure drop at time t, ΔPt, using the equation:

$$\% \ FR_i = \frac{\Delta P_i - \Delta P_i}{\Delta P_i} \times 100$$

Results

In table 2, all emulsions contain 20% by weight of cationic polymer.

TABLE 2

| e.g.: | Mass ratio R | Cationicity (mole %) | % FR max in 9% $CaCl_2$ | Time (sec) for FR max in 9% $CaCl_2$ | % FR max in API brine | Time (sec) Max FR in API brine | Max FR time in 2 × API brine | Max FR time in 2 × API brine |
|---|---|---|---|---|---|---|---|---|
| 1 | 1.5 | 15 | 4.22 | 300 | 5.93 | 300 | 2.95 | 300 |
| 4 | 2.5 | 15 | 30.35 | 297 | 21.69 | 300 | 17.31 | 300 |
| 7 | 4 | 15 | 33.51 | 259 | 34.43 | 264 | 33.4 | 273 |
| 2 | 1.5 | 20 | 5.84 | 300 | 7.72 | 300 | 6.53 | 300 |
| 5 | 2.5 | 20 | 50.29 | 95 | 48.09 | 87 | 46.21 | 101 |
| 8 | 4 | 20 | 49.13 | 22 | 51.75 | 28 | 49.62 | 35 |
| 3 | 1.5 | 35 | 6.76 | 300 | 5.19 | 300 | 2.47 | 300 |
| 6 | 2.5 | 35 | 38.31 | 199 | 40.23 | 222 | 33.88 | 256 |
| 9 | 4 | 35 | 42.81 | 135 | 43.24 | 143 | 40.24 | 155 |

The results show that the friction reduction performance is improved when the mass ratio R is increased. As salt concentrations increase, friction reduction performance decreases. But when the mass ratio R is chosen and adapted (within the scope of the invention), it becomes possible to obtain very good friction performances in brines and even high brines. Friction reduction performance is improved when the cationicity of the polymer is 20 mol %. Lower cationicity (15%) and higher cationicity (35%) offer lower performance.

The invention claimed is:

1. A water-in-oil reverse emulsion comprising:

an oil;

water;

at least one water-soluble cationic copolymer with an average molar mass of more than 3 million daltons, containing from 18 to 32 mole % of cationic monomers and between 68 and 82 mole % of nonionic monomers, wherein the cationic monomers of the water-soluble cationic copolymer are selected from the group consisting of dimethylaminoethyl acrylate (DMAEA) and its quaternized ammonium salts;

at least one reversing agent and at least one emulsifying agent, wherein the weight ratio R of the total amount of reversing agent to the total amount of emulsifying agent is from 2.5 to 4, the reversing agent being selected from the group consisting of an ethoxylated nonylphenyl, an ethoxylated and/or propoxylated alcohol, an ethoxylated tridecyl alcohol, and an ethoxylated/propoxylated fatty alcohol; and the emulsifying agent being selected from the group consisting of sorbitan monooleate, polyethoxylated sorbitan esters and diethanolamide of tall oil fatty acids.

2. The emulsion according to claim 1, wherein said emulsion comprises between 12 and 50% by weight of at the least one water-soluble cationic copolymer.

3. The emulsion according to claim 1, wherein the weight ratio R of the total amount of reversing agent to the total amount of emulsifying agent is from 3 to 4.

4. The emulsion according to claim 1, wherein the nonionic monomers of the water-soluble cationic copolymer are selected from the group consisting of acrylamide, methacrylamide, N-alkylacrylamides, N-alkylmethacrylamides, N,N dialkylacrylamides, N,N dialkylmethacrylamides, acrylic esters; and methacrylic esters.

5. The emulsion according to claim 1, wherein the water-soluble cationic polymer has an average molar mass of between 3 and 30 million daltons.

6. The emulsion according to claim 1, wherein said emulsion contains between 0.5 and 10% by weight of reversing agent and 0.5 and 16% by weight of emulsifying agent.

7. A method of preparing a fracturing fluid comprising:

a) providing of a reverse emulsion according to claim 1, b) reversing of the reverse emulsion by adding it to a brine, containing more than 30,000 ppm of salts and with a divalent ratio $R^{+} \geq 0.15$, $R^{+}$=mass ratio: divalent salts/total salts, and c) optionally adding at least one propping agent.

8. The method of preparing a fracturing fluid according to claim 7, wherein for b), the brine contains more than 70,000 ppm of salts.

9. The method of preparing a fracturing fluid according to claim 7, wherein for b), the brine has a divalent ratio $R^{+} \geq 0.20$.

10. The method of preparing a fracturing fluid according to claim 8, comprising:

a) providing a reverse emulsion according to the invention containing at least between 12 and 30% by weight of a water-soluble cationic copolymer containing between 18 and 32 mole % of dimethylaminoethyl acrylate quaternized with methyl chloride and between 68 and 82 mole % of acrylamide; at least one reversing agent and at least one emulsifying agent, the weight ratio R of the total amount of reversing agent to the total amount of emulsifying agent being from 2.5 to 4, b) reversing of the reverse emulsion by adding it to a brine, containing more than 100,000 ppm of salts and with a divalent ratio $R^{+} \geq 0.20$, $R^{+}$=mass ratio: divalent salts/total salts, in order to obtain a mass concentration of water-soluble cationic copolymers in the injection fluid that is between 0.05 and 1%, and c) optionally adding at least one propping agent.

11. A method of fracturing an underground formation comprising:

aa) providing a fracturing fluid obtained by the method of preparation of claim 7, bb) introducing the injection fluid into a part of the underground formation, cc) fracturing the underground formation with the injection fluid, and dd) recovering a mixture of gas, oil and aqueous fluid.

12. A method of reducing fracturing fluid friction in a hydraulic fracturing operation of an unconventional underground oil or gas reservoir comprising preparing a fracturing fluid according to claim 7 and injecting said fracturing fluid into an underground formation.

13. The emulsion according to claim 1, wherein the cationic monomer is dimethylaminoethyl acrylate quaternized with methyl chloride.

* * * * *